(No Model.)  2 Sheets—Sheet 1.
J. H. & J. L. WOOLARD.
COMBINED HARROW AND CULTIVATOR.
No. 315,106.  Patented Apr. 7, 1885.
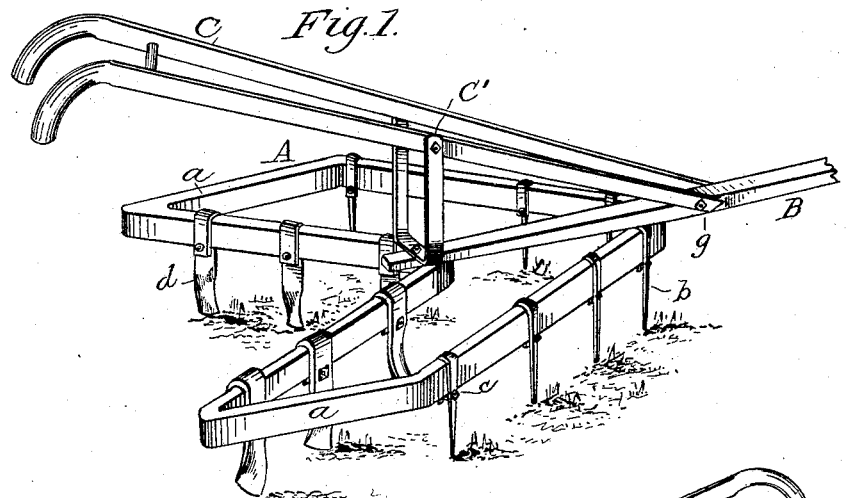
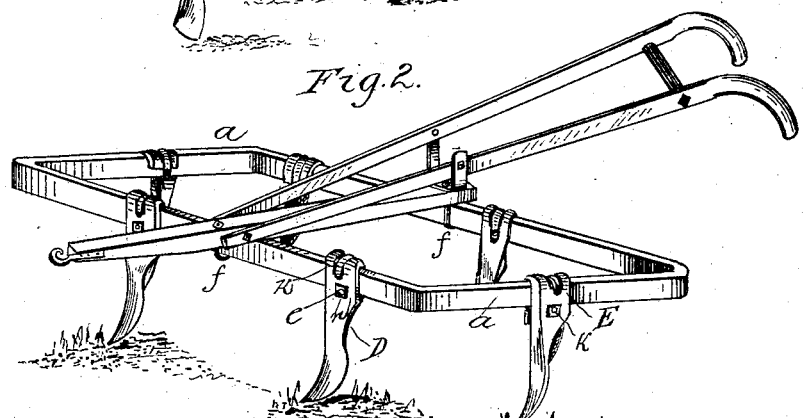
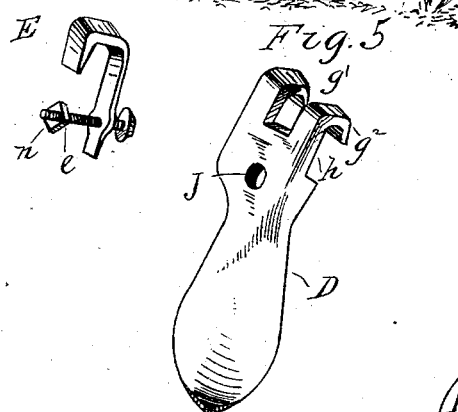
WITNESSES
Jesse H. Woolard
Josephus L. Woolard
INVENTORS
by C. A. Snow & Co.
Attorneys (No Model.) 2 Sheets—Sheet 2.

J. H. & J. L. WOOLARD.
COMBINED HARROW AND CULTIVATOR.

No. 315,106. Patented Apr. 7, 1885.

WITNESSES
J. S. Browns
E. G. Siggers.

Jesse H. Woolard
Josephus L. Woolard
INVENTORS by C. A. Snow & Co.
Attorneys

N. PETERS, Photo-Lithographer, Washington, D. C.

UNITED STATES PATENT OFFICE.

JESSE H. WOOLARD AND JOSEPHUS L. WOOLARD, OF WILLIAMSTOWN, NORTH CAROLINA.

COMBINED HARROW AND CULTIVATOR.

SPECIFICATION forming part of Letters Patent No. 315,106, dated April 7, 1885.

Application filed July 25, 1884. (No model.)

*To all whom it may concern:*

Be it known that we, JESSE H. WOOLARD and JOSEPHUS L. WOOLARD, citizens of the United States, residing at Williamstown, in the county of Martin and State of North Carolina, have invented a new and useful Combined Harrow and Cultivator, of which the following is a specification, reference being had to the accompanying drawings.

Our invention relates to a combined harrow and cultivator; and it has for its object to improve and simplify the details of construction of the same.

With the above and other objects in view the invention consists in the improved construction and combination of parts hereinafter fully described, and pointed out in the claims.

Figure 3:
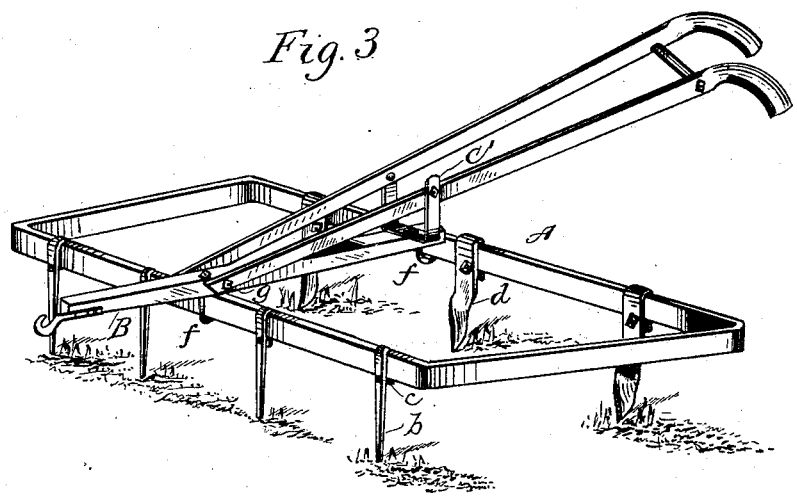
Figure 4:
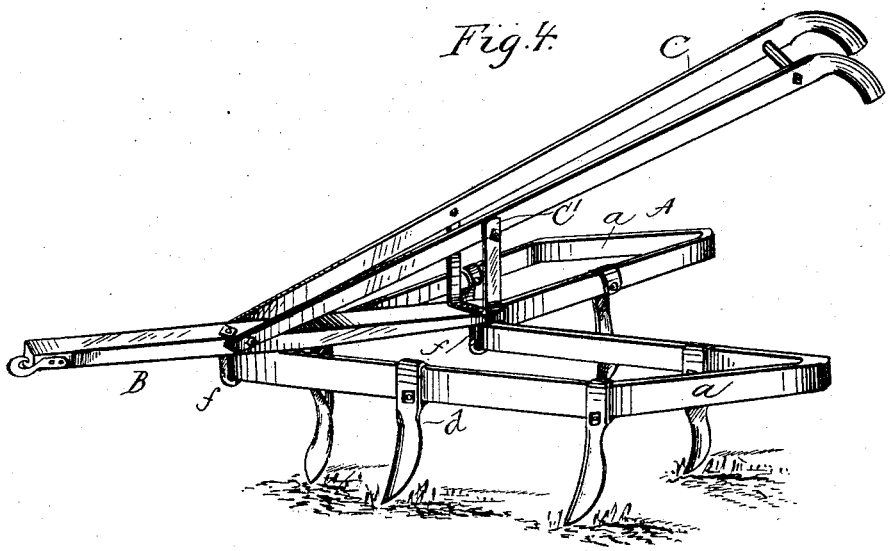

In the drawings, Figure 1 is a perspective view showing the arrangement of the harrow and cultivator teeth. Fig. 2 is a perspective view showing the interchangeable frame and the arrangement of the teeth thereon. Fig. 3 is a view of the single frame, showing another arrangement of teeth. Fig. 4 is a view of the double frame, showing a third arrangement of the teeth thereon; and Fig. 5 is a detail view of one of the teeth.

In the accompanying drawings, in which like letters of reference indicate corresponding parts in all the figures, A represents the frame, which is preferably constructed of wrought-iron. This frame, as will be seen, consists of two V-shaped sections, arranged one a slight distance in rear of the other, and having their outer ends connected by two parallel bars, $a$, formed integral with said sections. Upon the sides of the front section of the frame are arranged a series of harrow-teeth, $b$, which are constructed of wrought metal. The ends of said teeth are bent over the frame, and are secured in place by means of a transverse bolt, $c$, which passes through openings in said teeth. Upon the rear section are arranged a series of cultivator-teeth, $d$, which are secured in a similar manner to the harrow-teeth $b$.

B represents the draft-beam, which is provided at its rear end with a hole or opening. Passing through said openings in the draft-beam are hooks $f$, which engage the sections of the beam at the corner of the same. These hooks are screw-threaded at their upper ends to receive nuts for securing them in place. Upon the forward bolt is a bracket substantially U-shaped in form. At the upper end of this bracket there are openings.

C represents the handles, which are secured to the forward end of the draft-beam by means of a bolt, $g$, and are supported near their rear ends by the U-shaped bracket C', to which they are secured by means of bolts passing through said handles and the openings at the upper ends of said bracket.

In Fig. 2 is shown the interchangeable or single frame. As is clearly shown, this frame is of the form of a rhomboid. In this construction the beam is secured to the long sides of the frame on a line parallel with the short or end sides.

I have shown the frame provided with cultivator-teeth, one of which is secured between the draft-beam and the end $a$ of the frame, while another is secured on the forward short side or end of the frame. Another tooth is arranged upon the forward long side of the frame at the opposite end from the forward tooth, while another tooth is located on the other short side. It will be seen that by this arrangement the frame may be moved in a very small space.

In Fig. 3 I have shown the front or forward side of the single frame provided with a series of harrow-teeth, while the rear long side is provided with a series of cultivator-teeth.

In Fig. 4 I have shown the double frame arranged to be employed as a cultivator. In this case the cultivator-teeth are arranged, as shown, upon the sides of the V-shaped sections.

In Fig. 5 I have shown a modified form of tooth and means for securing the same to the sections composing the frame, this being the preferable construction when the teeth are cast.

D represents the tooth having at its upper end two inwardly-extending hooks, $g^2$, leaving a space, $g'$, between them, and formed upon its inner side with a seat, $h$, and with a hole or opening, $j$, adjacent to the lower end of said seat. The hooks are engaged with one of the sides of the frame, and the said side fits in the seat formed in said tooth. A hook, E, is then placed between the hooks $g^2$, and in the space $g'$, the end of said hook bearing on the front face of the tooth, as shown at $k$. The other end of the hook E extends below the side of the frame, and said lower end is provided with a hole or opening. Passing through said opening in the lower end of the hook and the opening in the tooth is a bolt; $l$, having a nut, $n$, by means of which the tooth is held in place upon the frame and all movement prevented.

It will be seen from the above description that either the single or double frame may be employed as a combined harrow and cultivator, or that the harrow-teeth may be removed and only the cultivator-teeth used.

The device is simple in its construction, may be manufactured at a comparatively slight cost, and is extremely durable in its construction.

Having fully described our invention, what we claim as new, and desire to secure by Letters Patent, is—

1. The combination, in a cultivator, of the V-shaped frames connected by integral parallel bars $a$, and carrying a series of adjustable teeth, the beam B, having hooks $f$, the handles, and the bracket C', substantially as set forth.

2. The combination, with the sides of the frame, of teeth having inwardly-extending hooks, and formed with a seat to receive the side of the frame, a hook fitting in the space between the hooks $g^2$ and bearing upon the front face of the tooth, and a bolt clamping said hook and the lower end of the tooth together, substantially as set forth.

In testimony that we claim the foregoing as our own we have hereto affixed our signatures in presence of two witnesses.

JESSE H. WOOLARD.
JOSEPHUS L. WOOLARD.

Witnesses:
W. Z. MORTON, Jr.,
W. J. HARDISON.